Aug. 28, 1962 W. W. DANIELS 3,051,212
REINFORCED COMPOSITE STRUCTURES
Filed June 26, 1959

INVENTOR
WILLIAM WARD DANIELS

BY *James S. Carle*

ATTORNEY

United States Patent Office 3,051,212
Patented Aug. 28, 1962

3,051,212
REINFORCED COMPOSITE STRUCTURES
William W. Daniels, Kinston, N.C., assignor to E. I. du Pont de Nemours and Company, Wilmington, Del., a corporation of Delaware
Filed June 26, 1959, Ser. No. 823,138
11 Claims. (Cl. 152—330)

This invention relates to improved reinforced rubber articles and to improved textile cords and fibers for reinforcing such articles. More particularly, this invention relates to improved reinforced rubber articles having high strength which retain their strength under high temperature operating conditions.

In recent years pneumatic tires have been subjected to increasingly severe operating conditions because of the higher speeds of automobiles and higher landing speeds of airplanes. Various attempts have been made to provide improved structures designed to resist the severe impact and high temperatures experienced in operating at high speeds or under heavy loads. Improvements in the rubber used in such applications and improvements in the cord and fabric used for reinforcing the rubber articles have been made; however, no entirely satisfactory cord or fabric has been developed. Attempts to use known synthetic fibers, such as polyethylene terephthalate and nylon, which are characterized by their high strength and low moisture sensitivity, have not been entirely satisfactory. Except for objectionable growth in use characteristics, nylon cords have been considered highly desirable. The polyethylene terephthalate cords exhibit excellent dimensional stability, i.e., low growth during service, and are known to have a high resistance to thermal degradation; however, they suffer excessive loss of tensile strength under high load and high speed conditions where high temperatures are developed. Efforts to remedy the loss of strength characteristics have been ineffective.

It is, therefore, the primary object of this invention to provide improved reinforced rubber articles which are characterized by superior performance when exposed to elevated temperatures for extended periods of time.

Another object is to provide improved pneumatic tires and vulcanized reinforced rubber articles which withstand severe flexing at elevated operating temperatures.

A further object of this invention is to provide improved textile cord and fabric for reinforcing vulcanized rubber articles.

Still another object of this invention is to provide a high performance linear condensation polyester industrial yarn which is resistant to loss of strength upon being heated in contact with rubber.

Other objects will become apparent from the following description of this invention.

The objects of this invention are accomplished by providing improved reinforced rubber articles which contain reinforcing fibrous structures prepared from linear terephthalate polyester filaments having a free carboxyl group concentration of less than 15 equivalents per million grams, an ether concentration of no more than 3 mol percent, a tenacity of above 6 grams per denier, and an initial modulus of at least 80 grams per denier.

Surprisingly, articles reinforced with the linear terephthalate polyester structures give superior performance even under very severe operating conditions. The reinforcing fibers do not exhibit the loss in strength which has heretofore been encountered when linear terephthalate polyesters are heated in contact with rubber for an extended period of time.

The following definitions will be used throughout the specification and claims:

The term "rubber" is intended to be used in its usual and accepted generic sense to include rubber substitutes, natural rubber, compounded rubber, synthetic rubber, and the like.

The term "free carboxyl groups" will be used to include both the un-ionized acid group, —COOH, and the ionized group, —COO⁻. The determination of the concentration of carboxyl groups is made in accordance with the procedure described by Pohl in Analytical Chemistry, vol. 26, page 1614, October 1954, and is expressed in equivalents per million grams.

The term "relative viscosity" refers to the ratio of the viscosity of a 10% solution of polyethylene terephthalate in a mixture of 10 parts of phenol and 7 parts of 2,4,6-trichlorophenol (by weight) to the viscosity of the phenol-trichlorophenol mixture, per se, measured in the same units at 25° C.

The term "intrinsic viscosity" is usually defined as the limit of the fraction $$\frac{\ln(r)}{c}$$

as $c$ approaches 0, where $r$ is the relative viscosity as defined above except that the relative viscosity is measured at several different concentrations in order to extrapolate to zero concentration.

By "linear terephthalate polyester" is meant a linear condensation polyester comprising recurring glycol dicarboxylate structural units in which at least about 85% of the recurring structural units are units of the formula

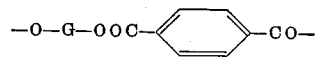

wherein —G— represents a divalent organic radical containing from about 2 to about 18 carbon atoms which is attached to the adjacent oxygen atoms by saturated carbon atoms. Preferably, the radical —G— contains from 2 to 10 carbon atoms. The terephthalate radical may be the sole dicarboxylate constituent of the recurring structural units, or up to about 15% of the structural units may contain other dicarboxylate radicals such as adipate, sebacate, isophthalate, bibenzoate, hexahydroterephthalate, and like radicals.

As previously indicated, in the preparation of the products of the present invention, it is essential that the concentration of free carboxyl groups in the linear terephthalate polyester filaments be maintained at a level below 15 equivalents per million grams; preferably, the concentration is below 10 equivalents per million grams. Present commercial fiber of linear terephthalate polyester fibers are known to have a free carboxyl group concentration from about 30 to 65 equivalents per million grams or higher. These fibers have a high resistance to thermal degradation. Surprisingly, however, when such fibers are embedded in rubber and used in applications where temperatures above about 110° C. are developed, they exhibit an excessive loss in strength. Even more surprising is the fact that when fibers of the present invention which have a limited concentration of free carboxyl groups are used, excellent results are obtained with only a very limited decrease in strength occurring.

It is also essential that the textile yarns and cords of this invention be prepared from linear terephthalate polyesters having a low concentration of aliphatic ether groups. The concentration of such groups should be no more than about 3 mol percent. Concentrations of ether groups above about 3 mol percent lower the melting point of the polymer and accelerate the rate of thermal degradation. For fibers which are to be utilized under severe service conditions, it is preferable that the concentration of ether groups be less than about 2.5 mol percent. A low ether group concentration may be achieved by scrupulous purification of the ingredients in the initial polymerization reaction and by the use of certain catalysts such as those disclosed by Izard in U.S. Patent 2,534,028. The percentage of the ether groups in the polyester as used herein refers specifically to the mol percent of aliphatic ether links, e.g., diethylene glycol and the like, in the polymer chain. The value is obtained by dividing the number of mols of the diethylene glycol in the sample by the total number of mols of repeating units in the sample, and then multiplying the quotient by 100. The concentration of ether groups may be readily determined by known chemical methods, by means of infrared absorption spectra, and by melting point determination.

In order to obtain the high performance yarns and cords of this invention it is also necessary that they be prepared from a polymer having a relative viscosity of at least 25. Although it is well known that polyesters having a relative viscosity of approximately 8 (or a corresponding intrinsic viscosity of about 0.3) are fiber-forming, the high degree of orientation required to provide high tenacity filaments from such polymers results in poor transverse properties as shown by low knot or loop strength. It has been found that filaments prepared from such polymers are susceptible to flex fatigue. For example, the flex life of a polyethylene terephthalate fiber having a relative viscosity of 37 is three times greater than that of a fiber prepared from a polymer having a relative viscosity of 20. For filaments designed for use under severe service conditions, it is preferred that the polymer have a realtive viscosity in the range from 30 to 60, or higher.

The tenacity and initial modulus of the fibers must also be controlled within the limits already specified. The tenacity should be above 6 grams per denier since at lower tenacities reinforced rubber articles, particularly pneumatic tires and heavy duty V-belts, possess inadequate strength. In order to provide dimensional stability, i.e., control the growth characteristics of the article, the initial modulus must be above 80 grams per denier. In general, an initial modulus above about 110 grams per denier is preferred.

In preparing the yarns and cords of this invention, a linear terephthalate polyester having a concentration of free carboxyl groups of less than 15 equivalents per million grams may be prepared in a number of different ways. One effective procedure is to treat the filaments, after they have been formed, with a chemical reagent which reacts with and "caps" the free carboxyl group. One such agent is diazomethane. Polyethylene terephthalate filaments in yarn or cord form may be reacted with diazomethane by immersing the yarn or cord in a dilute ether solution of diazomethane at room temperature for a sufficient length of time to reduce the carboxyl concentration to the desired level.

Another procedure which may be used to reduce the concentration of free carboxyl groups in linear terephthalate polyester is the procedure commonly referred to as "solid phase polymerization." This procedure is not only useful for reducing the carboxyl content but is also useful for increasing the molecular weight of the polymer. In this procedure, the polymer is first formed by known processes such as those disclosed by Whinfield and Dickson in U.S. Patent 2,465,319. The solid polymer is then cut to a finely divided state and heated in a dry inert gas at a temperature below the stick temperature of the polymer. A flow of inert gas through the polymer mass is maintained so that any glycol liberated is immediately removed from the system. The procedure is continued for several hours until the desired levels of molecular weight and free carboxyl concentration are obtained. It is surprising that this procedure reduces the free carboxyl content of linear terephthalate polyester since the prior art teaches that high temperature processes increase the free carboxyl content of such polymers.

In order to provide the desired tenacity, the filaments prepared from the linear terephthalate polyester may be drawn at least about 2.5 times their original length by known procedures. The drawing steps may be accomplished before or after any treatment used to reduce free carboxyl groups when a polymer having a concentration of such groups outside the limits of this invention is used.

To affect adhesion between the linear terephthalate polyester cords and a rubber, it is necessary to apply an adhesive coating to the cords. Any adhesive mixture may be used if it gives the desired level of adhesion between cord and rubber. For example, the cords may be coated with an organic solvent solution of a rubber and a polyisocyanate as described in U.S. Patent 2,415,839. Alternatively, the cords may be coated with an aqueous dispersion of a blocked isocyanate and a latex as described by Thompson et al., Adhesive Age, vol. II, page 30, February 1959.

In order to obtain top level performance from reinforced rubber articles, it is a general practice to first combine yarn ends into a cord of the desired size and twist, and then apply heat to the cord under tension in order to stabilize the cord properties and thereby reduce both shrinkage and growth, as well as obtaining higher strength. Advantageously the adhesive mixture may be applied to the cord immediately prior to the hot tensioning operation so that the adhesive is cured onto the cord during the heating step. Alternatively, the adhesive may be applied and dried onto the cord in a separate operation.

This invention will be further illustrated by reference to the accompanying drawings in which, FIGURE 1 is a perspective view of a section of a fiber reinforced pneumatic rubber tire of this invention;

Figure 1:
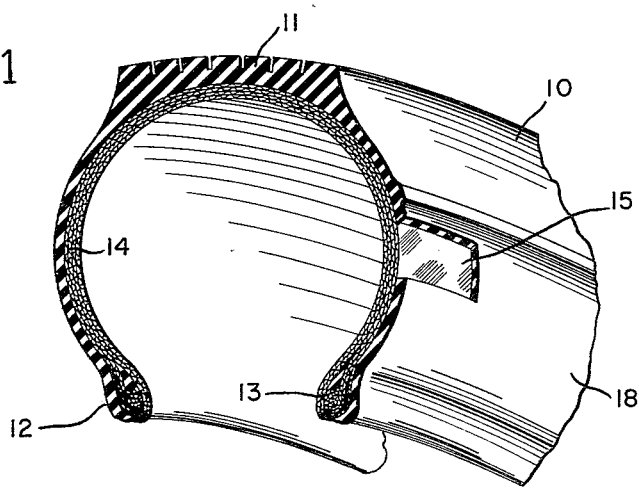

Referring to FIG. 1, the pneumatic tire 10 has a rubber tread member 11, inextensible beads 12 and 13, side walls 18, and a carcass member 14. The carcass member contains a plurality of plies 15, each of which consists of a plurality of parallel linear terephthalate polyester tire cords 16 embedded in rubber 17. The tire 10 may be fabricated in the usual manner with the linear terephthalate polyester cord of this invention being utilized in the plies 15. The tire may be vulcanized in a conventional manner.

Figure 2:
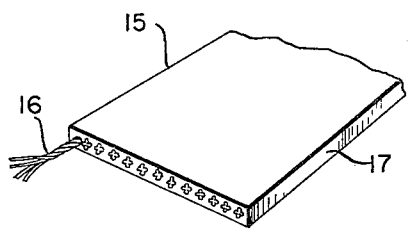
FIGURE 2 is an enlarged diagrammatic view in perspective of a section of a ply from the body of the tire in FIGURE 1 showing a cord projecting therefrom.

In FIG. 2, one of the cords 16 is shown projecting from one of the plies 15. The arrangement of the cords to provide a suitable tire cord fabric may, of course, be varied. A number of different patterns such as crisscross, diagonal, and the like, may be used.

Figure 3:
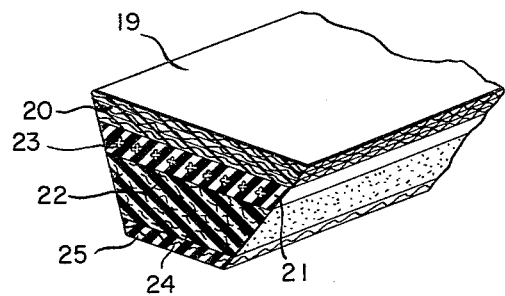
FIGURE 3 is a perspective cross-sectional view of a V-belt utilizing the reinforcing fibers of this invention.

Referring to FIG. 3, belt 19 is composed of a tension section 20, a neutral axis section 21, and a compression section 22. The tension section 20 is composed of a plurality of layers of rubberized linear terephthalate polyester fabric bonded to compose the tension section. The neutral axis section 21 consists of a soft rubber forming a resilient cushion between the tension section 20 and the compression section 22. Reinforcing cords 23 composed of linear terephthalate polyester extend longitudinally along the belt within the neutral axis section 21. Fine fibers 24 may be dispersed uniformly through the compression section 22 to give improved strength. A layer of rubberized fabric 25 prepared from linear terephthalate polyester filaments may be placed along the bottom surface of compression section 22 for reinforcement.

Figure 4:
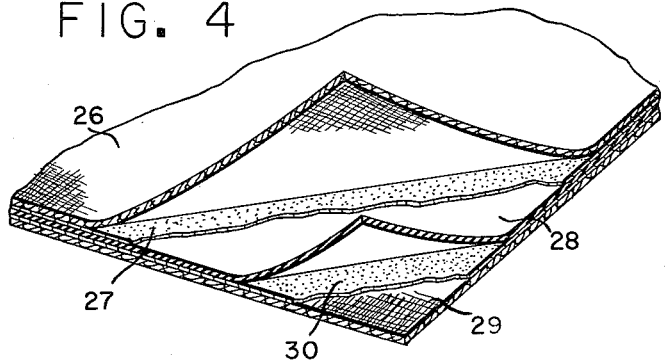
FIGURE 4 is a perspective view of a composite article formed in accordance with the present invention.

FIG. 4 illustrates a composite article which utilizes the improved linear terephthalate polyester filaments of this invention. A square of fabric 26 woven from the polyester filaments may be coated with an adhesive layer 27. The adhesive layer may be calendered with a layer of curable rubber 28, i.e., neoprene. A second piece of woven fabric 29 may likewise be coated with an adhesive film 30 and superimposed over the calendered layer of fabric 26. The superimposed layers may be calendered and cured to provide the composite article.

The following examples further illustrate the present invention.

EXAMPLE I

Using the general procedure described in U. S. Patent 2,647,885, highly purified dimethyl terephthalate and ethylene glycol are reacted in the presence of manganese acetate to form monomer, and the monomer is heated under vacuum in the presence of antimony oxide until a polymer is formed having a relative viscosity of 40, an ether link concentration of 2.5 mol percent, and a concentration of free carboxyl groups of approximately 29 eq./$10^6$ gm. The polymer is melt spun at a temperature of 290° C. through a 50-hole spinneret at a spinning speed of 150 yards per minute to give a spun yarn having a total denier of approximately 1300 (140 tex). The spun yarn, without being wound up, is immediately passed to a pair of heated feed rolls maintained at a temperature of 100° C. and rotating at a surface speed of 150 yards per minute. The yarn is then passed around a pair of heated draw rolls maintained at 195° C. and operating at a surface speed of 900 yards per minute. The yarn makes six wraps around the feed rolls and eight wraps around the draw rolls and then is wound up on a bobbin. When tested on an Instron tensile testing machine, the yarn is found to have a tenacity of 9.0 grams per denier, a break elongation of 10%, and an initial modulus of 130 grams per denier. The yarn is found to be composed of polymer having a relative viscosity of 37, an ether link concentration of 2.5 mol percent, and a concentration of free carboxyl groups of 31 eq./$10^6$ gm.

The yarn produced above is plied four ends using thirteen turns per inch of S twist. Two of the plied ends are then corded using thirteen turns per inch Z twist. The cord thus produced is coded sample A and serves as control in Example II.

A portion of sample A is treated with diazomethane by immersing the cord for three days at room temperature in a 0.5 molar solution of diazomethane in ether. The cords thus treated are coded sample B. Sample B is found to have a free carboxyl content of 0.6 eq./$10^6$ gm.

EXAMPLE II

Cord samples A and B from Example I are imbedded in a black rubber skim stock and the rubber is cured at 146° C. for 45 minutes while the cords are maintained under approximately ½ pound tension. After curing, the samples are allowed to condition for 24 hours at 65% relative humidity and at a temperature of 70° F. The rubber pad is then cut into strips, each containing an imbedded cord, and sealed into glass tubes. The sealed tubes are placed in a circulating air oven maintained at a temperature of 145±1° C. for 64 hours. The samples are then removed from the tubes and the cords separated from the rubber. Breaking strengths of the cords are determined on an Instron tensile tester using a six-inch sample and an elongation rate of three inches per minute. The results of the test are recorded in Table 1 below. The loss of breaking strength in the control sample is more than twice that of the test sample.

Table 1

| Measured Property | Sample A (Control) | Sample B (Test) |
|---|---|---|
| COOH Content, eq./$10^6$ gm | 31 | 0.6 |
| Original Breaking Strength_____pounds__ | 24.5 | 24.5 |
| Final Breaking Strength_____pounds__ | 12 | 18.6 |
| Loss of Break Strength_____percent__ | 55 | 24 |

EXAMPLE III

This example illustrates the use of solid phase polymerization to reduce the concentration of free carboxyl groups in polyethylene terephthalate, while at the same time increasing the relative viscosity of the polymer.

Polyethylene terephthalate, prepared by melt polymerization procedures known to the art, is cast as a ribbon and then cut in such a way that the majority of the polymer is between 8 and 14 mesh in size. The cut polymer is placed in a vessel having walls heated to a temperature of 225° C., and means for introducing an inert gas near the bottom of the vessel. A gaseous mixture consisting of 78% nitrogen and 22% carbon dioxide (free of moisture) is heated to a temperature of 215° C. to 220° C. and passed through the cut polymer in the heated container until the desired property level is achieved. The original and final values for relative viscosity and carboxyl concentration are given for three different samples in Table 2, below.

Table 2

| Sample | Original Properties | | Treating Time, Hrs. | Final Properties | |
|---|---|---|---|---|---|
| | RV | [COOH] | | RV | [COOH] |
| 1 | 26 | 19 | 10 | 52 | 14 |
| 2 | 43 | 18.6 | 4 | 62 | 8.4 |
| 3 | 30 | 17.8 | 8 | 63 | 7.5 |

EXAMPLE IV

Samples of polyethylene terephthalate cord having various carboxyl contents, but otherwise substantially equivalent, are tested according to the procedure of Example II with the results shown below in Table 3. The results shown in the table illustrate the remarkable improvement in resistance to degradation upon heating in contact with rubber which may be obtained by a substantial reduction in the carboxyl content of the polymer.

Table 3

Laboratory Performance Test (64 hrs. at 145°C. in Rubber)

| Class | Sample | Free Carboxyl Content eq. per $10^6$ gm. | Breaking Strength Lost in Test, Percent |
|---|---|---|---|
| High Carboxyl Control Samples | 1 | 26 | 60 |
| | 2 | 25 | 45 |
| | 3 | 30 | 49 |
| | 4 | 43 | 60 |
| | 5 | 55 | 77 |
| Low Carboxyl Test Samples | 6 | 14 | 27 |
| | 7 | 5 | 24 |
| | 8 | 4 | 20 |
| | 9 | 8 | 23 |
| | 10 | 12 | 29 |

EXAMPLE V

Polyethylene terephthalate yarn having a denier of 220 (24 tex), a tenacity of 7.6 grams per denier, a break elongation of 12%, and an initial modulus of 110 grams per denier, is prepared from polymer having a relative viscosity of 40, an ether content of 2.3 mol percent, and a carboxyl content of 6.5±1.5 eq./$10^6$ gm. The yarn is plied four ends with a Z twist of 13 turns per inch and then two plies are corded using 13 turns per inch of S twist. The greige cord is dipped in an adhesive formulation of the type described by Thompson et al., above, consisting of an aqueous dispersion of the bis-phenol adduct of methylene bis-(4-phenylisocyanate), gum tragacanth, and a mixture of a vinyl pyridine latex and a butadiene latex. The dipped cord is passed through an oven at a temperature of 220° C. under 3.0 pounds tension for an exposure period of one minute. The cord thus prepared is used to build a four-ply 8.50 x 14 automobile tire by standard methods known to the art. The tire is then subjected to an accelerated endurance test in which the tire is run against a steel wheel, four feet in diameter, at 65 m.p.h. under standardized inflation and load conditions, with an ambient temperature of 100° F. After completion of the test, the tire is dissected and the breaking strength of the cord is determined using an Instron Tester. The results are calculated in terms of percent strength loss per 1,000 miles. Cord taken from the fourth ply of this tire, the ply which usually undergoes the greatest strength loss, is found to exhibit no loss in strength.

In contrast, a similar (control) tire prepared from polyethylene terephthalate cord having a carboxyl content of 49 eq./10⁶ gm., when tested in the same manner, is found to give a cord strength loss of 12.1% per 1,000 miles.

EXAMPLE VI

Two polyethylene terephthalate cords, a test and a control, are prepared according to the procedure outlined in Table 4. Great care is taken in preparing the test sample to prevent the formation of excessive carboxyl groups. The concentration of ether links is also kept at a low level. The two samples are tested by the procedure described in Example II with the results shown at the end of Table 4. The loss of only 27% of the breaking strength of the test sample compared with a loss of 81% in the control sample is an indication of the remarkable improvement afforded by the use of yarns having a low carboxyl content.

10⁶ gm., subjected to the testing conditions described above, is found to give a cord strength loss of 19.8%, which is more than double the loss suffered by the test sample above.

Although in the foregoing examples the invention has been illustrated using polyethylene terephthalate yarns and cords, comparable results may be obtained by using other linear terephthalate polyesters. As previously indicated, linear condensation polyesters comprising recurring glycol dicarboxylate structural units in which at least about 85% of the recurring structural units are units of the formula

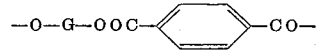

wherein —G— represents a divalent organic radical containing from 2 to about 18 carbon atoms and attached to the adjacent oxygen atoms by saturated carbon atoms may be used. Those polyesters in which the radical —G— contains from 2 to about 10 carbon atoms are preferred. The recurring structural units may contain up to about 15% of other dicarboxylate radicals, e.g., the adipate, sebacate, isophthalate, bibenzoate, and hexahydroterephthalate radicals. The linear terephthalate polyesters may be prepared by reacting terphthalic acid or a mixture of terephthalic acid and one or more other dicarboxylic acids with a glycol, HO—G—OH, where —G— is a radical as defined above, to form the bis-glycol ester or mixture of esters, followed by polycondensation at elevated tem-

*Table 4*

|  |  | Test | Control |
|---|---|---|---|
| Monomer Preparation | Ingredients | dimethyl terephthalate, ethylene glycol. | dimethyl terephthalate, ethylene glycol. |
|  | Catalyst | Mn(Ac)₂+Sb₂O₃ | Mn(Ac)₂+Sb₂O₃ |
|  | Batch Temp., °C | 225 | 240 |
| Polymer Preparation | Color inhibitor | H₃PO₄ | H₃PO₄. |
|  | Delusterant | TiO₂ | TiO₂. |
|  | Autoclave Temp | 275° C | 273° C. |
|  | Rel. Viscosity | 28 | 28. |
| Yarn Spinning | No. Filaments | 50 | 50. |
|  | Spinning Temp | 290° C | 290° C. |
|  | Spinning Speed | 605 y.p.m | 605 y.p.m. |
|  | Spun Denier | 1,185 (130 tex) | 1,185 (130 tex). |
| Yarn Drawing | Drawing Temp | 85° C | 85° C. |
|  | Draw Ratio | 5.63 | 5.47. |
|  | Draw Speed | 227 y.p.m | 227 y.p.m. |
| Yarn Properties | Carboxyls eq./10⁶ gm | 12 | 36 |
|  | Ethers, mol percent | 2.0 | 7.0 |
|  | Denier | 220 (24 tex) | 220 (24 tex). |
|  | Tenacity/Break Elongation | 6.9/9.0 | 6.1/10. |
|  | Loop Tenacity/Elongation | 5.0/3.8 | 4.5/3.6. |
|  | Initial Modulus | 134 | 132 |
| Cord Preparation | Construction | 220/4/2 | 220/4/2. |
|  | Twist, ply | 13 S | 13 S. |
|  | Twist, cable | 13 Z | 13 Z. |
|  | Cord Denier | 1,760 (195 tex) | 1,760 (195 tex). |
| Test as in Example II (64 hrs. at 145° C. in rubber). | Initial Breaking Strength, lbs | 23 | 18.8. |
|  | Final Breaking Strength, lbs | 17.5 | 3.7. |
|  | Strength Loss, percent | 27 | 81. |

EXAMPLE VII

A heavy duty cord is prepared from polyethylene terephthalate yarn having a carboxyl content of 4 eq./10⁶ gm. using 1100/3/3 construction with 3.2 turns/inch Z twist in the ply and 2.3 turns/inch S twist in the cable. After hot stretching and application of the adhesive described in Example V, the cord is found to have a tenacity of 6.2 grams per denier, a break elongation of 10.8%, and an initial modulus of 101 grams per denier. Using procedures known in the art, the cord thus prepared is built into a fabric covered V-belt of the cable cord type with a standard "B" cross section and a nominal length of 46 inches, using GR–S rubber. The vulcanized V-belt is then tested for fatigue resistance on a hanging weight stand using 3½ inch sheaves rotating at 3600 r.p.m. and a dead weight of 85 pounds. Ambient temperature is 100° F. After 900 hours on the test stand, the V-belt is dissected and the breaking strength of the cord measured, revealing that a cord strength loss of 8.5% is suffered in the test.

A similar belt (control) prepared from polyethylene terephthalate yarn having a carboxyl content of 32 eq./ perature and reduced pressure with elimination of excess glycol. In place of the acid or acids, ester-forming derivatives may be used, i.e., derivatives which readily undergo polyesterification with a glycol or derivative thereof. For example, the acid chloride or a lower alkyl ester, such as the dimethyl ester, may be used. Similarly, an ester-forming derivative of the glycol may be used in place of the glycol, i.e., a derivative of the glycol which readily undergoes polyesterification with dicarboxylic acids or derivatives thereof. For example, a cyclic oxide, such as ethylene oxide, from which the corresponding glycol can be derived by hydrolysis may be used.

The glycol, HO—G—OH, from which the polyester is prepared may be any suitable dihydroxy compound containing from 2 to 18 carbon atoms, preferably from 2 to 10 carbon atoms, in which the hydroxyl groups are attached to saturated carbon atoms. Thus, the radical —G— may be of the form —($C_{n+1}H_{2n+2}Y_{p-1}$)—, where $n$ and $p$ are positive integers and Y is a cycloaliphatic or an aromatic group. Examples of suitable glycols where $p=1$ include the polymethylene glycols, such as ethylene glycol, tetramethylene glycol, hexamethylene glycol, and decamethylene glycol as well as the branched chain glycols such as 2,2-dimethyl-1,3-propanediol and 2,2-dimethyl-1,4-butanediol. Suitable glycols in which $p=2$ include trans-p-hexahydroxylylene glycol, and bis-p-(2-hydroxyethyl)benzene. Glycols in which $p=3$ include 4,4'-bis-(beta-hydroxyethyl biphenyl, 2,2-bis(4-hydroxy phenyl)-propane, and 4,4'-bis-(beta-hydroxyethyl)dodecahydrobiphenyl. In general, the glycols in which $p$ is greater than 3 are of lesser interest. Mixtures of the glycols may be used.

This invention has been particularly described with respect to the use of continuous filament yarns and cords prepared therefrom. In some end uses it may be desirable to use short length fibers. It is considered within the scope of this invention to use low carboxyl linear terephthalate polyester fibers of any appropriate length for reinforcing rubber articles where the advantages of improved resistance to loss of strength at high temperatures are desired.

The yarns and cords of this invention, which have been described particularly with respect to pneumatic tires and V-belts, are useful in many types of reinforced rubber articles. Their particular advantage appears when the reinforced rubber article is exposed to a high temperature for a long period of time. Rubber articles which may advantageously be reinforced with the linear terephthalate polyester yarns and cords of this invention include flat belts, tarpaulins and other rubber-coated fabrics, hydraulic hose for use in automobiles and other vehicles, reinforced rubber bellows in airspring suspension systems for automotive vehicles, steam hose, and the like.

It will be apparent that many widely different embodiments of this invention may be made without departing from the spirit and scope thereof, and therefore it is not intended to be limited except as indicated in the appended claims.

I claim:

1. A composite structure comprising a rubber article having incorporated therein reinforcing fibers prepared from a linear terephthalate polyester having a relative viscosity of at least 25, said fibers having a concentration of free carboxyl groups of less than 15 equivalents per million grams, an ether concentration of not more than 3 mol percent, a tenacity above 6 grams per denier, and an initial modulus of at least 80 grams per denier.

2. The structure of claim 1 wherein said polyester is polyethylene terephthalate.

3. The structure of claim 1 wherein said relative viscosity is above 30 and said concentration of free carboxyl groups is below 10 equivalents per million grams.

4. A vulcanized rubber article reinforced with a fibrous structure prepared from a linear terephthalate polyester having a relative viscosity of at least 25, said fibrous structure having a concentration of free carboxyl groups of less than 15 equivalents per million grams, an ether concentration of not more than 3 mol percent, a tenacity above 6 grams per denier, and an initial modulus of at least 80 grams per denier.

5. The fibrous structure of claim 4 wherein said polyester is polyethylene terephthalate.

6. The fibrous structure of claim 4 wherein said relative viscosity is above 30 and said concentration of free carboxyl groups is below 10 equivalents per million grams.

7. In a pneumatic tire including a tread member, inextensible beads, and a body member, the improvement which comprises a plurality of plies of tire cord fabric embedded in rubber, said fabric being prepared from filaments of a linear terephthalate polyester having a relative viscosity of at least 25, said filaments having a concentration of free carboxyl groups of less than 15 equivalents per million grams, an ether concentration of not more than 3 mol percent, a tenacity above 6 grams per denier, and an initial modulus of at least 80 grams per denier.

8. A textile yarn comprised of filaments of a linear terephthalate polyester having a relative viscosity of at least 25, said filaments having a concentration of free carboxyl groups of less than 15 equivalents per million grams and an ether concentration of not more than 3 mol percent.

9. The yarn of claim 8 wherein said polyester is polyethylene terephthalate.

10. A high modulus, high strength, flexible cord adapted for use in composite rubber structures consisting of twisted strands of filaments prepared from a linear terephthalate polyester having a relative viscosity of at least 25, said filaments having a concentration of free carboxyl groups of less than 15 equivalents per million grams and an ether concentration of not more than 3 mol percent.

11. An improved industrial yarn characterized by resistance to thermal degradation when embedded in rubber comprised of filaments of a linear terephthalate polyester having a relative viscosity of at least 25, said filaments having a concentration of free carboxyl groups of less than 15 equivalents per million grams, an ether concentration of not more than 3 mol percent, a tenacity above 6 grams per denier, and an initial modulus of at least 80 grams per denier.

References Cited in the file of this patent

UNITED STATES PATENTS

| 2,436,979 | Standley et al. | Mar. 2, 1948 |
| 2,450,948 | Foster | Oct. 12, 1948 |
| 2,512,433 | Leben | June 20, 1950 |
| 2,863,854 | Wilson | Dec. 9, 1958 |
| 2,863,855 | Wilson et al. | Dec. 9, 1958 |

FOREIGN PATENTS

| 792,011 | Great Britain | Mar. 19, 1958 |